(12) United States Patent
Ren et al.

(10) Patent No.: US 8,571,062 B1
(45) Date of Patent: *Oct. 29, 2013

(54) MULTICHANNEL DATA CONVERSION INTO PACKETS

(75) Inventors: Xingen (James) Ren, Acton, MA (US); Ravi Subrahmanyan, Windham, NH (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/900,943

(22) Filed: Oct. 8, 2010

Related U.S. Application Data

(63) Continuation of application No. 12/015,130, filed on Jan. 16, 2008, now Pat. No. 7,835,393.

(51) Int. Cl.
*H04J 3/16* (2006.01)

(52) U.S. Cl.
USPC .......................................................... 370/466

(58) Field of Classification Search
None
See application file for complete search history.

(56) References Cited

U.S. PATENT DOCUMENTS 7,835,393 B2 * 11/2010 Ren et al. .................... 370/466

* cited by examiner

*Primary Examiner* — Minh-Trang Nguyen

(57) ABSTRACT

A system and method are provided for converting multichannel serial data streams into packets. The method accepts a plurality of serial data streams in a corresponding plurality of channels. In a time domain multiplexed (TDM) fashion, groups with an undetermined number of data bits are packed from each data stream, into an associated channel segment queue, where each segment includes a predetermined number of bits. In a TDM fashion, segments are loaded into an associated channel payload queue, where each payload includes a predetermined number of segments. Once a payload is filled, an associated pointer is created in a pointer queue. The method selects a pointer from the pointer queue, creates a packet from the payload associated with the selected pointer, and transmits the packet via a packet interface. The packet overhead may include information stored in the pointer, a packet header, or a cyclic redundancy check (CRC) checksum.

19 Claims, 5 Drawing Sheets

MULTICHANNEL DATA CONVERSION INTO PACKETS

RELATED APPLICATIONS

This application is a Continuation of a application entitled, SYSTEM AND METHOD FOR CONVERTING MULTICHANNEL TIME DIVISION MULTIPLEXED DATA INTO PACKETS, invented by Xingen (James) Ren et al., Ser. No. 12/015,130, filed Jan. 16, 2008, now U.S. Pat. No. 7,835,393, which is incorporated herein by reference.

BACKGROUND OF THE INVENTION

1. Field of the Invention

This invention generally relates to digital communication systems and, more particularly, to a system and method for converting multichannel serial data streams into packet network communications.

2. Description of the Related Art

Conventionally, voice has been carried over Time Division Multiplexed (TDM) networks, such as E1/T1/E3/T3 and SDH/SONET networks. The emergence of packet data communications, such as Internet Protocol (IP) networks, has led to the convergence of TDM traffic into the IP networks. Packet networks, which were initially designed to carry time-insensitive data traffic, are not designed to address the concerns of real-time services like voice and video, which are conventionally carried over TDM networks.

Digital transport networks evolved as isolated links connecting analog switching systems for analog Public Switched Telephone Networks (PSTNs). Originally, digitized voice channels were multiplexed onto serial streams, framed, and line coded with completely unsynchronized clocks. Digital communications evolved to Plesiochronous Digital Hierarchy (PDH), which permits clock rates of interfacing streams to vary from a nominal value with a given tolerance. The variance is resolved by elastic stores and, in higher multiplexing rates, by bit stuffing. There are three closely related standards for digital trunks of primary rate, E1-E3 (Asia and Europe), the T1-T3 (North America), and J1-J3 (Japan). In a PDH transmission chain, a plurality of lower level digital signals are bit-wise, or bit and byte-wise time division multiplexed together to form a higher level signal, with the bit rate of the higher level signal being greater than the sum of the rates of the tributary signals to account for overhead functions in the higher rate signal, such as framing, parity, error detection, alarms, maintenance, and timing adjustment.

The bits of each lower level digital signal are written into an input buffer (one buffer per input tributary), with the write frequency equal to the incoming tributary instantaneous bit rate. The tributary bits are then read, according to a local system clock, and multiplexed by bit-interleaving or byte-interleaving. To take care of deviation in the rates between different tributaries and the multiplex signal, certain bit positions within the output multiplex frame (justification or stuffing opportunity bits) can carry either tributary or dummy bits. The justification decision (i.e., if the stuffing opportunity bit should carry information or be a dummy) is made frame-by-frame on the basis of a buffer threshold mechanism. Therefore, the actual number of tributary bits in the output multiplex frame varies dynamically and the transmission capacity gets adapted to the actual bit rate of the incoming tributary.

In a TDM format, data is transported in small chunks at a regular rate. The data stream is at a more or less uniform rate, with only small perturbations, which occur due to rate adaptation mechanisms within the network, or due to impairments in the network. Within such a network transport, applications must maintain the uniformity of the data rate to within tight specifications, which is generally done using a phase conditioning circuit in the transmit path. Such a phase conditioning circuit works by storing data in a buffer and playing it out to a mapper at a regulated rate. In order to maintain low latency requirements, the buffer is small (of the order of several bytes).

Since PDH networks work on independent clocking mechanisms, the differences in clock rates result in buffer slips, whose effect is negligible in voice conversations, but detrimental to data and video traffic. To address this problem, network architectures (SDH/SONET) have been adopted where all the network elements are synchronized and running at the same average frequency. Transient variations are accommodated by a mechanism called pointer adjustments.

In SONET, the base signal is referred to as Synchronous Transport Signal level-1 (STS-1), which operates at 51.84 Mb/s. Higher-level signals are integer multiples of STS-1, creating the family of STS-N signals, for N=1, 3, 12, 48, 192, & 768. An STS-N signal is composed of N byte-interleaved STS-1 signals. The optical counterpart for each STS-N signal is designated as OC-N (Optical Carrier level-N). TDM traffic is mapped onto an SPE (SONET) or a virtual container (SDH), which in turn is associated with Path Overhead (POH) to form an Administrative Unit in SDH. The pointer mechanism is used to take care of the asynchronous phase of the SONET/SDH traffic and also to compensate for frequency offsets between transmission systems.

FIG. 1 depicts a single channel device for converting a TDM stream into packets (prior art). The TDM data are available as a bit-serial data stream. This data stream can be an incoming data stream (e.g., a DS-1 or E-1 stream of data), or it can be demapped from a multiplexed format. Here, a demapper is not shown. The data stream may also be desynchronized from the mapped structure. In this case, there may be a "smooth" clock accompanying the data stream at the rate of the data. If the data are only demapped and not desynchronized, the data may be carried by the clock of the multiplexed format, with gaps to accommodate the different rate.

The bit serial stream is packed into bytes by data packer 100, which are put into a byte FIFO 102. When a sufficient number of bytes are accumulated to form a packet payload, the payload is transmitted by the packet interface logic 104, which also adds a suitable header to the data to form the entire packet. The header information may include cycle redundancy check (CRC) checksum information. Alternately, the packet interface logic 104 may calculate the CRC as the packet is transmitted. In the system of FIG. 1, it is possible to transmit the packet immediately after a payload full of bytes is accumulated.

FIG. 2 depicts a system for packing a multichannel stream of TDM data into a packet format (prior art). The TDM stream containing many channels is demapped by demapper 200 into individual bit-streams. Each stream is then packed into bytes by a corresponding packer 202 and the bytes are put into byte FIFOs 204, one per channel. Each FIFO 204 is typically larger than just one packet-payload. A scheduler 206 is then used to poll each FIFO to see if it has accumulated a packet-payload worth of bytes. Typically, a round-robin scheme may be used to poll the channels. If the FIFO for a channel has enough bytes when it is polled, control is passed to the packet interface logic 208, which adds a header and transmits the packet. The next channel is then polled.

The scheme of FIG. 2 works because the overall available bandwidth on the packet interface is much larger than the bandwidth of any one TDM stream, and is also larger than the combined bandwidth of all the TDM streams being packed. In fact, the bandwidth on the packet interface is typically greater than the combined bandwidth of all the TDM streams being packetized, plus the bandwidth needed for any overhead that is added to the payloads to form the packet. Therefore, despite the pauses associated with the polling routine, overall, the round robin scheme is able to keep up with the accumulation of packet-payloads from the various TDM streams.

A multichannel TDM stream (e.g., an STS-3 or STS-12 SONET stream containing many DS-1s and/or E-1s) may contain an arbitrary distribution of rates in the different channels. The rates of the different channels are generally not known a-priori. Therefore, it is not possible to set up a polling schedule which favors higher-speed channels or chooses channels in some other manner. It is therefore common to pick a straightforward round-robin scheme. Alternately stated, if a stream carries higher-rate data, it should be given more polling chances. However, a system such as the one shown in FIG. 2 cannot poll a higher-rate channel more often unless the rates in the various channels are precisely known beforehand.

As a result, some of the timing information inherently contained in the TDM streams may be lost in the process of packetizing. For example, if a first channel is only 1 byte short of a packet payload worth of data when it is polled, the scheduler can go on to the next channel, and will only service the first channel when it comes back around to it in rotation. Depending on the number of channels and the specific polling scheme, this process imposes a "waiting-time" on the packet transmission. This waiting time depends on the interaction between the polling schedule and the TDM rates. This waiting time can result in a phenomenon similar to waiting time jitter, or more generally, phase deviation. As used herein, the term jitter refers to phase-deviation at all frequencies. Jitter is a problem commonly associated with the bit-stuffing mechanisms for mappers, but in this scenario the magnitude of the jitter is greater as compared to bit-stuffing, because of the multi-byte packets. The timing of each TDM stream is impaired by this process.

It would be advantageous if a system could packetize multichannel serial data streams or TDM streams while better preserving the timing of the various streams.

SUMMARY OF THE INVENTION

As noted above, the conventional method for converting a data stream (e.g., a DS-1 or E-1 channel) into packet format packs the data into a payload and then transmits it as a packet. When a TDM data stream (e.g., multiple DS-1s or E-1s in a SONET payload) is converted into packets and transmitted, as is done in circuit-emulation, the method of packing the data can result in loss of timing information. For data termination applications, this loss of timing information is not important. But for timing-sensitive applications, it is important to retain as much of the timing information as possible for eventual recovery. This present invention describes a method for converting multichannel TDM data into packets, better preserving the timing information individually for each channel.

Accordingly, a method is provided for converting multichannel serial data streams into packets in a data communication interface. The method accepts a plurality of serial data streams in a corresponding plurality of channels. In a TDM fashion, groups with an undetermined number of data bits are packed from each data stream, into an associated channel segment queue, where each segment includes a predetermined number of bits. For example, a segment may be a byte. In a TDM fashion, segments are loaded into an associated channel payload queue, where each payload includes a predetermined number of segments. Once a payload is filled, an associated pointer is created in a pointer queue. The method selects a pointer from the pointer queue, creates a packet from the payload associated with the selected pointer, and transmits the packet via a packet interface. Typically, the packet includes overhead, which may be information stored in the pointer, a packet header, and/or a cyclic redundancy check (CRC) checksum.

More explicitly, the segments may be loaded into a first-in first-out (FIFO) memory, and the pointers may include information such as the FIFO address of the associated payload, the channel of the payload, and channel alarms. Advantageously, if the plurality of serial data streams is accepted on channels having a corresponding plurality of data rates, then packets can be created for each channel at a rate responsive to the corresponding channel data rate.

Additional details of the above-described method and a data communication system for converting multichannel serial data streams into packets are provided below.

DETAILED DESCRIPTION

Figure 1:
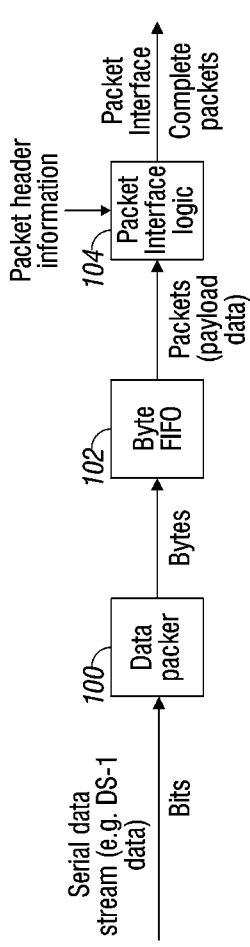
FIG. 1 depicts a single channel device for converting a TDM stream into packets (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 3:
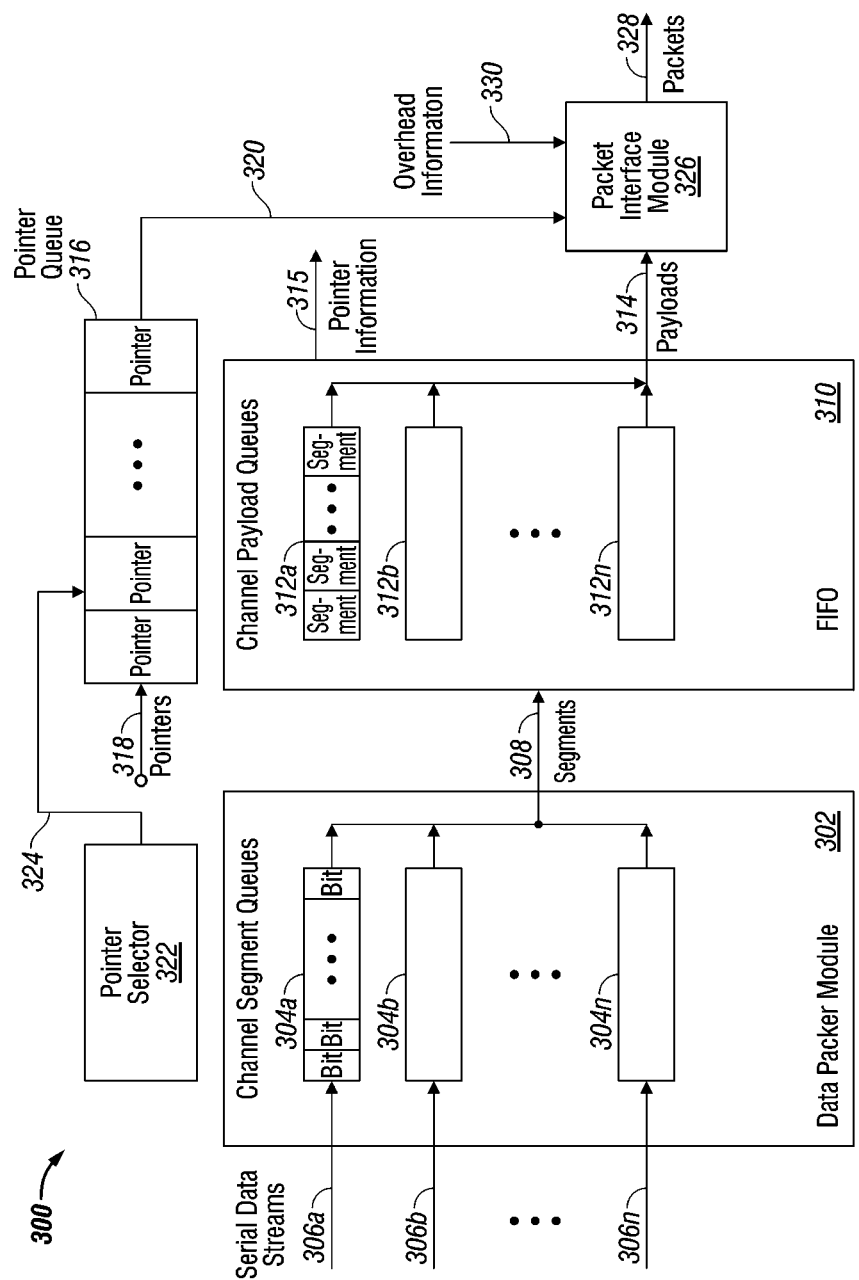
FIG. 3 is a schematic block diagram depicting a data communication system for converting multichannel serial data streams into packets.

FIG. 3 is a schematic block diagram depicting a data communication system for converting multichannel serial data streams into packets. The system 300 comprises a data packer module 302 with channel segment queues. Shown are channel segment queues 304a through 304n, where n is not limited to any particular number. The data packer module 302 has an input to accept a plurality of serial data streams on lines 306a through 306n in a corresponding plurality of channels A through n. The data packer module 302 packs groups with an undetermined number of data bits in a time domain multiplexed (TDM) fashion from each data stream into an associated channel segment queue. That is, only one data stream is serviced in any particular time interval. A "group" is the collection of a non-predetermined number of valid data bits accepted in a predetermined number of clock cycles. A data stream or channel does not necessarily supply a regular or consistent number of valid data bits in a predetermined period of time. The data packer module 302 supplies segments from each channel segment queue at an output on line 308, where each segment includes a predetermined number of bits. For example, a segment may be a unit of one byte or two bytes. Typically, the data packer module channel segment queues 304a through 304n each have a width of greater than 1 segment. That is, each channel segment queue can "hold" more than 1 segment.

Figure 6:
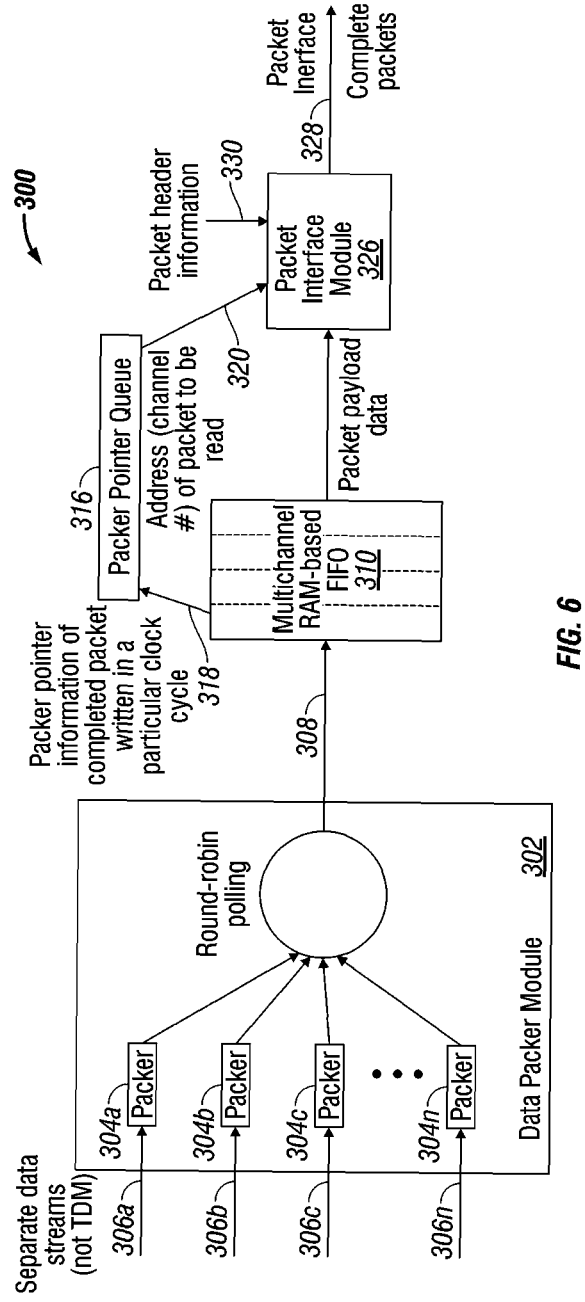
FIG. 6 is a schematic block diagram depicting a second variation of the system of FIG. 3.

In one aspect, the data packer module 302 supplies segments from the channel segment queues 304a through 304n using a round robin polling process (see FIG. 6). Alternately, the data packer module supplies segments triggered in response to the channel segment queues being filled or partially filled to a threshold level.

A multichannel first-in first-out (FIFO) 310 includes channel payload queues 312a through 312n, having an input on line 308 to accept segments from the data packer module 302 in a TDM fashion. The FIFO 310 loads segments into associated channel payload queues 312. The FIFO 310 has an output on line 314 to supply payloads from each channel payload queue 312, where each payload includes a predetermined number of segments. Typically, the multichannel FIFO channel payload queues 312a through 312n each have a width of greater than 1 payload. The FIFO 310 has an output on line 315 to supply pointer information, so that pointers may be created, which are associated with the stored payloads.

A pointer queue 316 has an input on line 318 to accept pointers with payload information in response to filling an associated payload in the multichannel FIFO 310. The pointers may include information such as the FIFO address of the associated payload, the channel of the payload, and channel alarms. The pointer queue 316 has an output to supply pointers on line 320. A pointer selector 322 has an output on line 324 to select a pointer from the pointer queue 316. Various criteria may be used for selecting a pointer from the pointer queue 316. A pointer may be randomly selected or selected based upon the pointer position in the pointer queue. Or, a specific channel number may be given priority by selecting pointers from that channel when they are available. For example, the pointer at the head of the queue may be selected. As another alternative, a pointer may be selected based upon the fact that a threshold number of payloads exist in an associated channel payload queue. As another example, a pointer may be selected with the largest number of payloads in an associated channel payload queue.

A packet interface module 326 has an input on line 314 to accept the payload from the multichannel FIFO 310, associated with the selected pointer. The packet interface module 326 creates a packet from the payload accepted on line 314, and transmits the packet via a packet interface on line 328. For example, the packet interface on line 328 may be a SPI4.2 interface. However, other packet protocols are known in the art and the system is not limited to any particular protocol.

In one aspect, the packet interface module 326 accepts the selected pointer on line 320, and the pointer information is used by the packet interface module to access and load the appropriate payload from FIFO 310. Alternately but not shown, some other mechanism or module may accept the pointer information on line 320. This alternate mechanism then accesses the appropriate payload from FIFO 310, and directs the accessed payload to packet interface module 326 for packetization. In another aspect, the packet interface module 326 has a pointer input connected to output of the pointer queue 316 on line 320, as shown, and the packet interface module 326 creates a packet with packet overhead using information stored in a pointer associated with the packet payload.

In a different aspect, the packet interface module 326 has a packet header input on line 330. Then, the packet interface module 326 creates the packet with packet overhead information such a packet header or a cyclic redundancy check (CRC)

checksum, as supplied on line 330. As another alternative, the packet header or CRC may be generated by the packet interface module.

Figure 4:
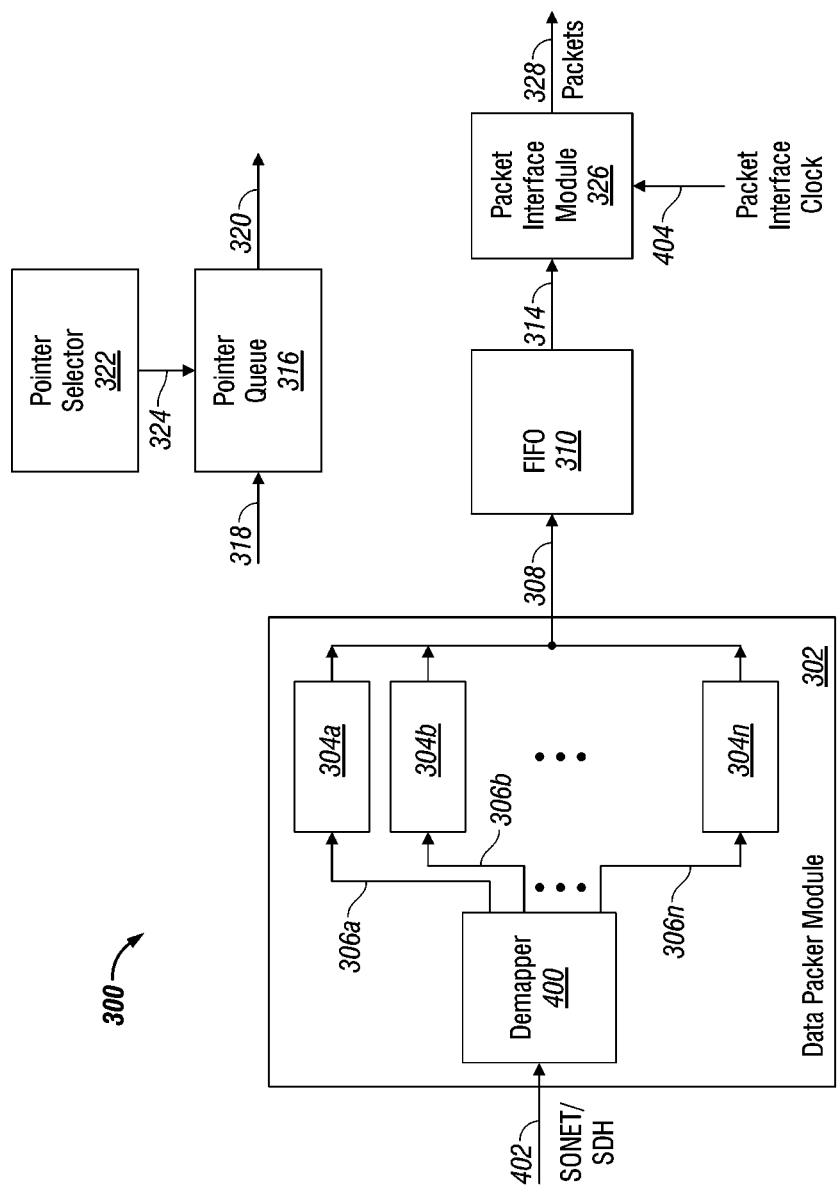
FIG. 4 is a schematic block diagram depicting a TDM variation of the system of FIG. 3.

FIG. 4 is a schematic block diagram depicting a TDM variation of the system of FIG. 3. In this aspect, the data packer module 302 includes a demapper 400 having an input on line 402 to accept a Synchronous Optical Network/Synchronous Digital Hierarchy (SONET/SDH) frame, and an output on lines 306a through 306n to supply the plurality of serial data streams as a plurality of TDM data streams demapped from the frame.

In one aspect, the demapper forms a plurality of TDM data streams on lines 306a through 306n with an associated plurality of TDM channel clocks. That is, each TDM stream may possibly have a different clock. In other aspects, multiple SONET streams may be accepted, each carrying some TDM channels with their own clock rates. The multichannel FIFO 310 writes segments into the channel segments queues 312a through 312n in accordance with the corresponding TDM channel clocks. However, the packet interface module 326 creates the packet by reading the payload from the multichannel FIFO 310 in accordance with a packet interface clock on line 404.

Generally, the packet interface module 326 transmits packets on line 328 at a data rate greater than the combined plurality of channel data rates. Referencing either FIG. 3 or FIG. 4, in some aspects the data packer module 302 accepts the plurality of serial data streams associated with lines 306a through 306n on channels having a corresponding plurality of data rates. The packet interface module 326 creates packets for each channel at a rate responsive to the corresponding channel data rate. For example, the channel associated with line 306b may have a data rate that is greater than the data rate of the channel associated with line 306a. In this example, the packet interface module 326 generally supplies packets associated with channel B at a proportionally greater rate than the data rate of channel A packets.

Although the system shown in FIGS. 3 and 4 has been defined in terms of hardware circuitry, it should be understood that some elements of the system may be enabled as microprocessor instructions stored in memory and executed by a microprocessor or logic-coded state machine.

Functional Description

Figure 5:
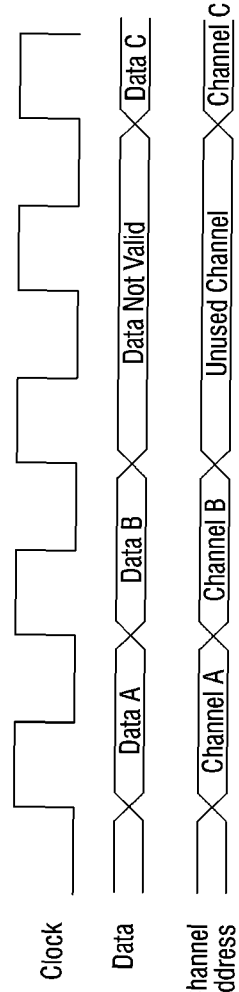
FIG. 5 is a diagram depicting a multichannel TDM data stream (prior art).

FIG. 5 is a diagram depicting a multichannel TDM data stream (prior art). The system shown in FIGS. 3 and 4 can be better appreciated with an understanding of the format of a multichannel TDM data stream. Shown are a TDM data stream with channels A, B, and C. The TDM interface includes at least the following parts: a clock, a data bus, and a channel address. As is shown, the channel address and data are synchronized, and change together on clock edges. In this example, the bus first carries data for channel A, then for channel B. There is then a dead period of 2 cycles during which the bus does not carry any valid data. In this example, the periods of invalid data are indicated by an invalid address. The clock cycle after the dead periods carries data for channel C. Therefore, in any clock cycle, only data for one channel is carried in the TDM stream.

Returning to FIG. 4, a multichannel TDM stream is first demapped and packed using a multichannel packer or data packer module 302. The multichannel packer may be enabled in a random access memory (RAM), to keep track of remaining bits from the incoming TDM stream. The RAM can be thought of as an M1×N1 array where M1 is the number of channels and N1 is the depth of each channel-storage in bits.

In one implementation, N1 is 15 bits. Since the TDM data carries data from a single channel in any one clock cycle, that channel number is used as the row index M1. A transformation may be applied to the channel number to go from the normally sparse range of channel addresses to a continuous range of addresses to make efficient use of the RAM. If the incoming data from the demapper 400 is a full segment (e.g., a byte), then that byte is written into the packer RAM and a byte's worth of data is taken out from the packer and written into the multichannel FIFO 310 that follows the packer. If the data coming from the demapper 400 has some bits (less than a byte), that information is tracked and added to the existing count of bits. When the count of bits reaches a byte, then that packed byte is read out from the packer RAM and written into the multichannel FIFO.

The data packer module 302 is followed by a RAM-based structure which implements a multichannel FIFO 310. The FIFO may be implemented as a circular buffer. The FIFO RAM can be thought of as an M2×N2 array where M2 is the number of channels and N2 is the depth of each FIFO in bytes. Since the TDM data carries data from a single channel in any one clock cycle, that channel number is used as the row index M2. Generally, M2=M1, though that is not necessary. A transformation may be applied to the channel number to go from the normally sparse range of channel addresses to a continuous range of addresses to make efficient use of the RAM. As discussed above, in any clock cycle, a particular channel is processed, and a packed byte is either available or not available for that channel. If a byte is available, it is written into the row (one of M2) represented by that channel address.

The RAM width N2 is a multiple of the packet payload size in bytes. In one aspect, the channel payload queues in the FIFO 310 are 4 payloads wide. Typically, the channel payload queues are at least 2 payloads wide, but may be wider without loss of timing information. The additional storage can be used to increase the latency if needed. The width of the channel payload queues also depends on the speed of the packet bus compared to the speed of the TDM bus. In the clock cycle in which a byte is written into the FIFO from the packer side, a determination is also made as to whether at least one payload worth of data is available in that FIFO. Alternately, a holdoff threshold can be set. For example, a channel payload queue may be checked to determine if 2 or more payloads worth of data are available for that channel in the FIFO. If the threshold is met, then some packet pointer information is written into a packet pointer queue 316 in that same clock cycle. The packet pointer information may include the channel number and position of the packet payload in the FIFO, as well as status information, including alarms for that TDM channel. The write position in the channel payload queue is then incremented for the next packet payload. Then, in the next clock cycle, the next channel is processed.

The packet interface module 326 may be used to determine if there is an entry in the channel payload queue, or if a holdoff value is set, whether there are sufficient entries available in the queue. The packet interface module 326 then reads the packet pointer information from the queue. In this aspect, the packet interface module 326 acts as the pointer selector 322. In a simple implementation, the first packet pointer in the pointer queue is selected. The first pointer contains information to determine the position of the associated payload in the FIFO 310. A packet worth of data (i.e., a payload) is read from that channel address in the FIFO. After adding a header, the packet is transmitted. The packet interface module then reads the next address from the channel payload queue and processes that channel.

Figure 2:
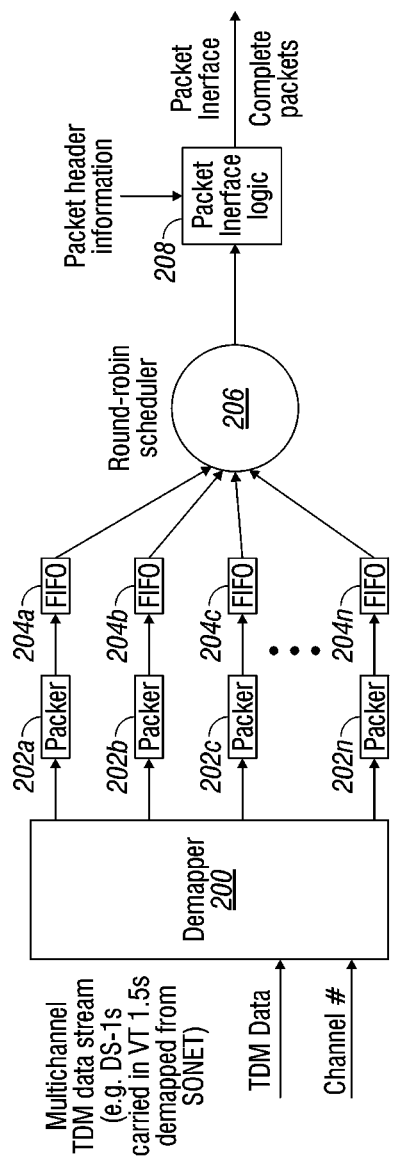
FIG. 2 depicts a system for packing a multichannel stream of TDM data into a packet format (prior art).

Since only one TDM channel is processed in a clock cycle, only one channel can complete in the packer, and only one channel can reach the threshold of having sufficient payloads in the FIFO. In one aspect, as soon as any given channel reaches a threshold, its packet pointer information is written into the pointer queue 316. Therefore, by transmitting packets in the order in which they are written into the pointer queue, channels are automatically processed in the order in which they complete—reaching the threshold of having a packet-payload worth of data. In this aspect, channels automatically get packet transmission chances in the exact proportion of their data rate relative to other channels. A faster channel will complete more packet-payloads faster, and will therefore get more transmission chances relative to a slower channel. The relative rates of the channels are therefore maintained and are not convolved with the timing of a polling scheme as in the conventional implementation of FIG. 2. As a result, the system of FIG. 4 maintains the timing of the original TDM streams in the transmission order of the packets.

Another benefit of the system of FIG. 4 is that port bandwidth utilization is automatically monitored by the number of entries in the channel payload queue. If a channel payload queue overflows, the implication can be drawn that the packet bandwidth cannot keep up with the aggregate line TDM rate. Also, by dynamically adjusting the channel payload queue holdoff threshold, more or fewer entries can be stored in the payload FIFO, which allows instantaneous adjustments to be made to the transmitted packet bandwidth. This holdoff adjustment mechanism is useful as a packet bandwidth management tool at the system level.

FIG. 6 is a schematic block diagram depicting a second variation of the system of FIG. 3. The system 300 of FIG. 6 is useful in the case of serial data streams that are not necessarily TDM data, but which have been demapped from a higher-order structure. As shown, the serial data streams 306a through 306n may be packed into the multichannel FIFO 310 using a polling scheme. For example, a round robin polling scheme may be used. In this case, there will be some waiting time jitter introduced by the polling scheme. However, since the number of channels is usually low due to limitations on the number of line interfaces supported on a device, that waiting time is likely to be small. In addition, the waiting time is also reduced in this case because the round-robin polling in the case of FIG. 6 is at the byte-level, as compared to the packet-level round-robin shown in FIG. 2.

Figure 7:
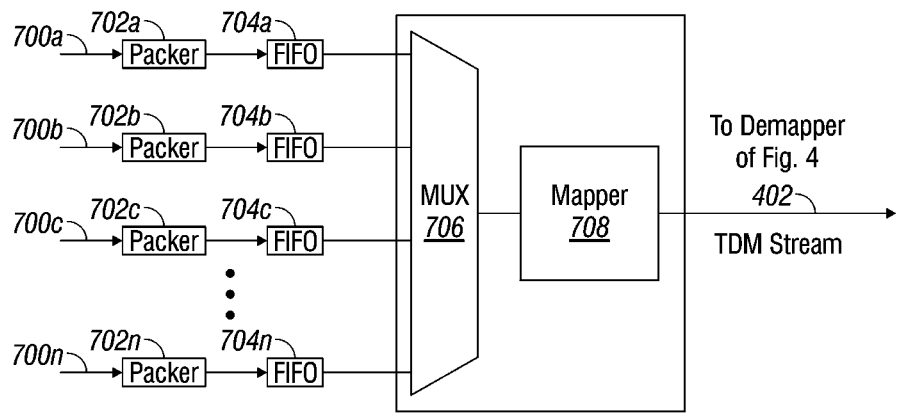
FIG. 7 is a schematic block diagram depicting a jitter attenuator for converting serial data streams into a multichannel TDM stream.

FIG. 7 is a schematic block diagram depicting a jitter attenuator for converting serial data streams into a multichannel TDM stream. In this aspect, multiple streams on lines 700a through 700n can be packed into a multichannel TDM stream on line 402 using a jitter attenuator. The jitter attenuator need not necessarily use conventional bit-asynchronous mapping, as alternate mapping schemes with different waiting time jitter characteristics may be used. This system may advantageously be used to improve the timing of an incoming TDM stream. Even if the incoming TDM stream is perfectly timed, it can be mapped into the TDM stream on line 402 with, at most, up to one bit time of waiting time jitter. The data, in TDM format, can then be processed using the system depicted in FIG. 4.

Generally, the systems depicted in FIGS. 3, 4, and 6 have the advantage of automatically handling the timing-domain crossover from the TDM clock domain to the packet-interface clock domain. From the data writing perspective, the multichannel FIFO and pointer queue operate in the TDM clock domain. From the data reading perspective, the multichannel FIFO and the pointer queue operate in the packet-interface clock domain. By defining a holdoff threshold of greater than 1 payload in the FIFO, it is guaranteed that the payload being read from the packet side is not the same as the one being written from the TDM side. This issue is important because the two clock domains are asynchronous and there is otherwise no guarantee that the address being processed from the packet side is not the same as the one being written to from the TDM side. This present invention, therefore, automatically manages the clock domain crossing.

It is not necessary to read the channel payload queues in the FIFO in the order in which the payloads are written in. In some cases, it may be advantageous to randomize the order of transmission, or impose some other order. Although such an alternate ordering scheme may not maintain the timing as well as a scheme where packets are sent in the order in which they accumulate in the FIFO, there may be other advantages to such an ordering.

Figure 8:
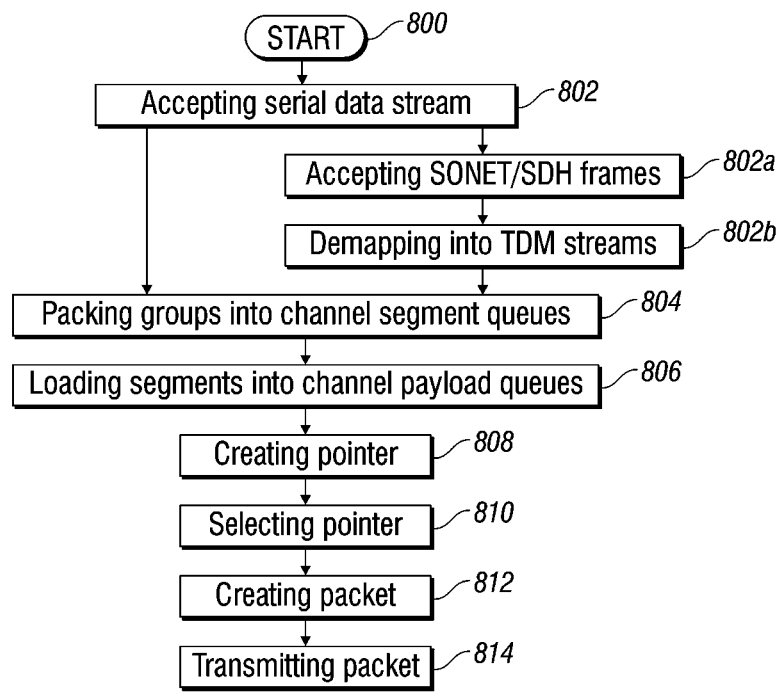
FIG. 8 is a flowchart illustrating a method for converting multichannel serial data streams into packets in a data communication interface.

FIG. 8 is a flowchart illustrating a method for converting multichannel serial data streams into packets in a data communication interface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 accepts a plurality of serial data streams in a corresponding plurality of channels. Step 804 packs groups with an undetermined number of data bits in a TDM fashion, from each data stream, into an associated channel segment queue, where each segment includes a predetermined number of bits. In a TDM fashion, Step 806 loads segments into an associated channel payload queue, where each payload includes a predetermined number of segments. In response to filling a payload, Step 808 creates an associated pointer in a pointer queue. Step 810 selects a pointer from the pointer queue. Using the payload associated with the selected pointer, Step 812 creates a packet. In one aspect, creating the packet in Step 812 includes creating packet overhead with information such as information stored in the pointer, a packet header, or a CRC checksum. Step 814 transmits the packet via a packet interface.

In one aspect, accepting the plurality of serial data streams in Step 802 includes substeps. Step 802a accepts SONET/SDH frame. Step 802b demaps the frame into a plurality of TDM data steams. Further, the TDM data streams formed in Step 802b may each have an associated (and different) TDM channel clock. Then, loading segments into the associated channel payload queue (Step 806) includes writing segments in accordance with the corresponding TDM channel clocks. However, when the packet is created in Step 812, the payload is read in accordance with a packet interface clock.

In another aspect, Step 802 accepts the plurality of serial data streams on channels having a corresponding plurality of data rates. Then, creating the packet in Step 812 includes creating packets for each channel at a rate responsive to the corresponding channel data rate, and greater than the combined plurality of channel data rates.

In a different aspect, packing groups from each data stream into the associated channel segment queue (Step 804) includes forming channel segment queues, each having a width of greater than 1 segment. Likewise, loading segments into the associated channel payload queue in Step 806 includes forming channel payload queues, each having a width of greater than 1 payload. In one variation Step 806 loads segments into the associated channel payload queue using a round robin polling process.

In one aspect, Step 806 loads segments into a FIFO memory. Then, creating the associated pointer in the pointer queue (Step 808) includes storing information in the pointer such as the FIFO address of the associated payload, the channel of the payload, and channel alarms.

In another aspect, selecting the pointer from the pointer queue in Step 810 includes using criteria such as pointer position in the pointer queue, channel payload queues having a threshold number of payloads, random selection, the channel payload queue having the largest number of payloads, and predefined channel number.

A system and method are presented for converting multichannel serial data streams into packets. Examples of particular circuit blocks and logical steps have been given to illustrate the invention. However, the invention is not limited to merely these examples. Other variations and embodiments of the invention will occur to those skilled in the art.

We claim:

1. In a data communication interface, a method for converting multichannel serial data streams into packets, the method comprising:
   accepting a plurality of serial data streams in a corresponding plurality of channels;
   in a time domain multiplexed (TDM) fashion, packing groups with an undetermined number of data bits, from each data stream, into an associated channel segment queue, where each segment includes a predetermined number of bits;
   in a TDM fashion, loading segments into an associated channel payload queue, where each payload includes a predetermined number of segments;
   in response to filling a payload, creating an associated pointer in a pointer queue;
   selecting a pointer from the pointer queue;
   using the payload associated with the selected pointer, creating a packet; and,
   transmitting the packet via a packet interface.

2. The method of claim 1 wherein creating the packet includes creating packet overhead with information selected from a group consisting of information stored in the pointer, a packet header, and a cyclic redundancy check (CRC) checksum.

3. The method of claim 1 wherein accepting the plurality of serial data streams includes:
   accepting a Synchronous Optical Network/Synchronous Digital Hierarchy (SONET/SDH) frame; and,
   demapping the frame into a plurality of TDM data steams.

4. The method of claim 3 wherein demapping the frame into the plurality of TDM data streams includes forming a plurality of TDM data streams with an associated plurality of TDM channel clocks;
   wherein loading segments into the associated channel payload queue includes writing segments in accordance with the corresponding TDM channel clocks; and,
   wherein creating the packet using the payload associated with the selected pointer includes reading the payload in accordance with a packet interface clock.

5. The method of claim 1 wherein accepting the plurality of serial data streams includes accepting the plurality of serial data streams on channels having a corresponding plurality of data rates; and,
   wherein creating the packet includes creating packets for each channel at a rate responsive to the corresponding channel data rate, and greater than the combined plurality of channel data rates.

6. The method of claim 1 wherein packing groups from each data stream into the associated channel segment queue includes forming channel segment queues, each having a width of greater than 1 segment; and,
   wherein loading segments into the associated channel payload queue includes forming channel payload queues, each having a width of greater than 1 payload.

7. The method of claim 1 wherein loading segments into the associated channel payload queue includes loading segments into a first-in first-out (FIFO) memory; and,
   wherein creating the associated pointer in the pointer queue includes storing information in the pointer selected from a group consisting of a FIFO address of the associated payload, the channel of the payload, and channel alarms.

8. The method of claim 1 wherein selecting the pointer from the pointer queue includes using criteria chosen from a group consisting of:
   pointer position in the pointer queue;
   channel payload queues having a threshold number of payloads;
   random selection;
   the channel payload queue having the largest number of payloads; and,
   pre-defined channel numbers.

9. The method of claim 1 wherein loading segments into the associated channel payload queue includes loading segments using a round robin polling process.

10. A data communication system for converting multichannel serial data streams into packets, the system comprising:
    a data packer module with channel segment queues, having an input to accept a plurality of serial data streams in a corresponding plurality of channels, the data packer module packing groups with an undetermined number of data bits in a time domain multiplexed (TDM) fashion from each data stream into an associated channel segment queue, and supplying segments from each channel segment queue at an output, where each segment includes a predetermined number of bits;
    a multichannel first-in first-out (FIFO) with channel payload queues, having an input to accept segments from the data packer module in a TDM fashion and loading segments into associated channel payload queues, and having an output to supply payloads from each channel payload queue, where each payload includes a predetermined number of segments;
    a pointer queue having an input to accept pointers with payload information in response to filling an associated payload in the multichannel FIFO, and having an output to supply pointers;
    a pointer selector having an output to select a pointer from the pointer queue; and,
    a packet interface module having an input to accept the payload from the multichannel FIFO associated with the selected pointer, creating a packet from the accepted payload, and transmitting the packet via a packet interface.

11. The system of claim 10 wherein the packet interface module has a pointer input connected to output of the pointer queue, the packet interface module creating the packet with packet overhead from information stored in a pointer associated with the packet payload.

12. The system of claim 10 wherein the packet interface module has a packet header input, the packet interface module creating the packet with packet overhead information selected from a group consisting of a packet header and a cyclic redundancy check (CRC) checksum.

13. The system of claim 10 wherein the data packer module includes a demapper having an input to accept a Synchronous Optical Network/Synchronous Digital Hierarchy (SONET/SDH) frame and an output to supply the plurality of serial data streams as a plurality of TDM data streams demapped from the frame.

14. The system of claim 13 wherein the demapper forms a plurality of TDM data streams with an associated plurality of TDM channel clocks;
   wherein the multichannel FIFO writes segments into the channel segments queues in accordance with the corresponding TDM channel clocks; and,
   wherein the packet interface module creates the packet by reading the payload from the multichannel FIFO in accordance with a packet interface clock.

15. The system of claim 10 accepting the data packer module accepts the plurality of serial data streams on channels having a corresponding plurality of data rates; and,
   wherein the packet interface module creates packets for each channel at a rate responsive to the corresponding channel data rate, and greater than the combined plurality of channel data rates.

16. The system of claim 10 wherein the data packer module channel segment queues each have a width of greater than 1 segment; and,
   wherein the multichannel FIFO channel payload queues each having a width of greater than 1 payload.

17. The system of claim 10 wherein pointer queue accepts pointers with information selected from a group consisting of a FIFO address of the associated payload, the channel of the payload, and channel alarms.

18. The system of claim 10 wherein the pointer selector selects the pointer from the pointer queue using criteria chosen from a group consisting of random selection, pointer position in the pointer queue, a threshold number of payloads in an associated channel payload queue, the largest number of payloads in an associated channel payload queue, and predefined channel numbers.

19. The system of claim 10 wherein data packer module supplies segments from the channel segment queues using a round robin polling process.

\* \* \* \* \*